United States Patent [19]

Canterino

[11] Patent Number: 4,475,971
[45] Date of Patent: Oct. 9, 1984

[54] METHOD FOR FORMING STRONG CROSS-LAMINATED FILMS

[75] Inventor: Peter J. Canterino, Towaco

[73] Assignee: Mobil Oil Corporation, New York, N.Y.

[21] Appl. No.: 500,807

[22] Filed: Jun. 8, 1983

Related U.S. Application Data

[63] Continuation of Ser. No. 336,106, Dec. 30, 1981, abandoned.

[51] Int. Cl.³ ............... B29D 7/02; B32B 31/18; B32B 31/20; B32B 31/30
[52] U.S. Cl. ............... 156/163; 156/229; 156/244.11; 156/244.18; 156/244.24; 156/264; 264/288.4; 264/291; 264/292
[58] Field of Search ........... 156/163, 229, 243, 244.11, 156/244.14, 244.18, 244.23, 244.27, 264, 494, 500; 264/288.4, 291, 292; 428/105, 212, 218

[56] References Cited

U.S. PATENT DOCUMENTS

| | | | |
|---|---|---|---|
| 3,048,895 | 8/1962 | Bottomley | 18/57 |
| 3,342,657 | 9/1967 | Dyer | 156/244.14 |
| 3,350,491 | 10/1967 | Rasmussen | 264/288 |
| 3,354,253 | 11/1967 | Rasmussen | 264/288 |
| 3,370,111 | 2/1968 | Boone | 264/2 |
| 3,397,101 | 8/1968 | Rausing | 156/244.24 |
| 3,491,185 | 1/1970 | Rasmussen | 264/288 |
| 3,758,354 | 9/1973 | Sakurai et al. | 159/79 |
| 3,853,661 | 12/1974 | Sudo | 156/244 |
| 4,022,646 | 5/1977 | Casey | 156/229 |
| 4,039,364 | 8/1977 | Rasmussen | 156/164 |
| 4,047,997 | 9/1977 | Sudo | 156/229 |
| 4,116,892 | 9/1978 | Schwarz | 521/62 |
| 4,140,827 | 2/1979 | Willwerth et al. | 428/151 |
| 4,144,008 | 3/1979 | Schwarz | 425/66 |
| 4,147,291 | 4/1979 | Akao et al. | 428/218 |
| 4,147,827 | 4/1979 | Breidt et al. | 428/218 |
| 4,258,848 | 3/1981 | Akao et al. | 428/218 |

Primary Examiner—Caleb Weston
Attorney, Agent, or Firm—Alexander J. McKillop; Michael G. Gilman; Charles J. Speciale

[57] ABSTRACT

There is provided a method for forming a cross-laminated plastic film by (1) forming flat, composite, coextruded film having a higher melting layer and a lower melting layer, (2) orienting the composite film on a bias and (3) contacting lower melting surfaces of the film at temperatures at which the surfaces adhere to one another.

9 Claims, 3 Drawing Figures

METHOD FOR FORMING STRONG CROSS-LAMINATED FILMS

BACKGROUND

This is a continuation of copending application Ser. No. 336,106, filed Dec. 30, 1981, now abandoned.

The present invention relates to a method for forming strong cross-laminated films.

Cross-laminated films have desirable strength characteristics. One means of forming such films is by slitting oriented films, which have been oriented vertically or horizontally, on a bias and then laminating the bias slitted films by means of a pressure-sensitive adhesive.

SUMMARY

The present invention relates to an improved method for forming a strong cross-laminated film. More particularly, the present invention relates to a method for forming a cross-laminated film by the steps of: (i) forming flat, coextruded composite film of fixed width, said composite film having a layer of a lower melting thermoplastic and a layer of a higher melting thermoplastic; (ii) orienting said composite film of step (i) on a bias; and (iii) contacting surfaces of said film of step (ii) which have lower melting layers under temperature conditions at which said surfaces adhere to one another.

DETAILED DESCRIPTION

According to an aspect of the present invention, a composite film is formed by coextruding a layer of a lower melting thermoplastic with a layer of a higher melting thermoplastic. Preferably, the thickness of the lower melting thermoplastic layer is as thin as possible but should be sufficiently thick to achieve the ultimate laminated product. For example, the thickness of the lower melting layer may be about 10% of the overall thickness of the composite film, and the thickness of the higher melting layer may be about 90% of the overall thickness of the composite film. The overall thickness of the composite film may be, for example, from about 0.5 to about 10 mils.

The higher melting layer may be formed from any suitable semi-crystalline polymer such as polyethylene, nylon, polyester, polypropylene, etc. Examples of composite films contain a higher melting layer of high density polyethylene and a lower melting layer of a polymer selected from the group consisting of an ethylene/-vinylacetate copolymer, a low density polyethylene polymer and an ethylene/propylene copolymer.

Bias orientation of the composite film may take place by any suitable means. An example of a suitable means is illustrated in FIG. 1.

Figure 1:
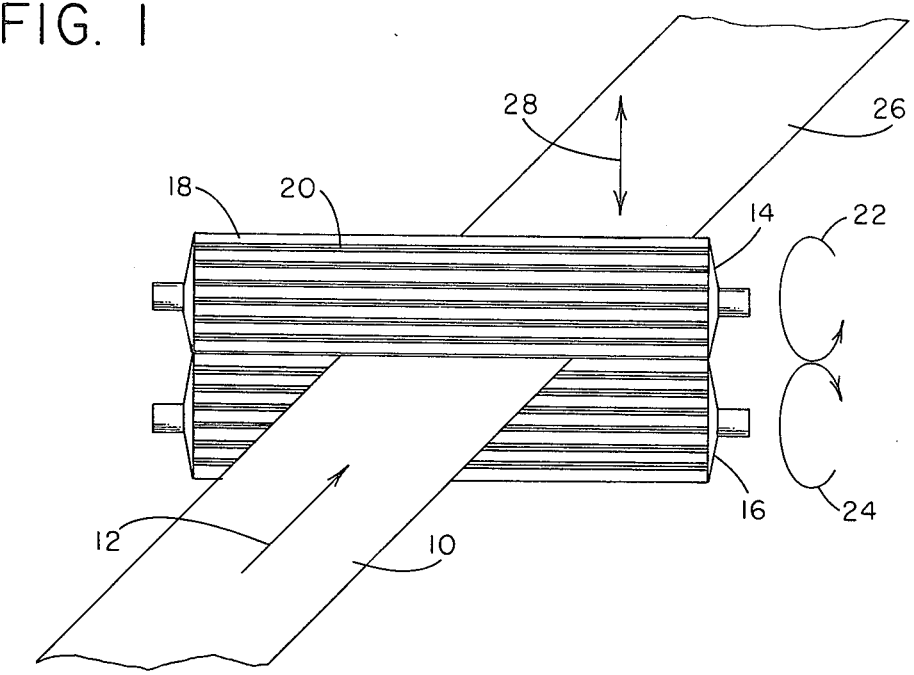
FIG. 1 shows a method for forming a bias oriented composite film.

In FIG. 1 a flat, coextruded composite film 10 is fed along the direction of arrow 12 to a set of matched rolls 14 and 16. The direction of travel 12 corresponds to the lengthwise direction of the composite film 10. Accordingly, the composite film 10 is passed through the rotating rolls 14 and 16 in a manner such that the direction of travel forms an angle which is not perpendicular to the axis of rotation of the rolls.

Rolls 14 and 16 each have a matched set of grooves 18 and ridges 20. As depicted in FIG. 1, these grooves and ridges are parallel to the axis of rotation of rolls 14 and 16. As rolls 14 and 16 rotate along the direction of arrows 22 and 24 respectively, grooves match up with ridges of the respective rolls to exert a stretching or orienting force on the film in a direction perpendicular to the axis of rotation of the rolls. Accordingly, the oriented composite film 26 is oriented along the direction of bidirectional arrow 28. This direction of orientation is neither parallel nor perpendicular to the lengthwise or widthwise direction of the oriented film 26.

Alternative means may be used for bias orienting the composite film. For example, rolls 14 and 16 of FIG. 1 may be replaced with rolls which have a pattern of grooves and ridges which are perpendicular to the axis of rotation of the rolls. Such replacement rolls would exert a stretching force on composite film 10 which is parallel to the axis of rotation of the rolls. Another means for bias orienting films is described in the Rasmussen U.S. Pat. No. 3,354,253, the entire disclosure of which is expressly incorporated herein by reference.

Figure 2:
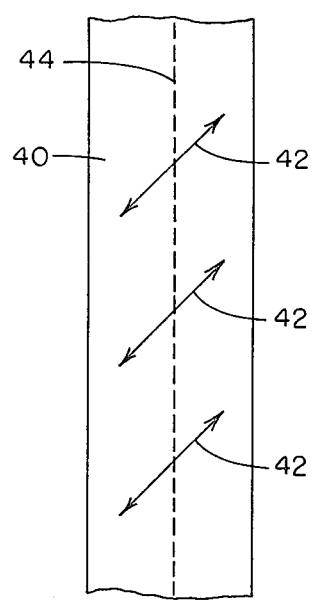
FIG. 2 shows a bias oriented composite film.
Figure 3:
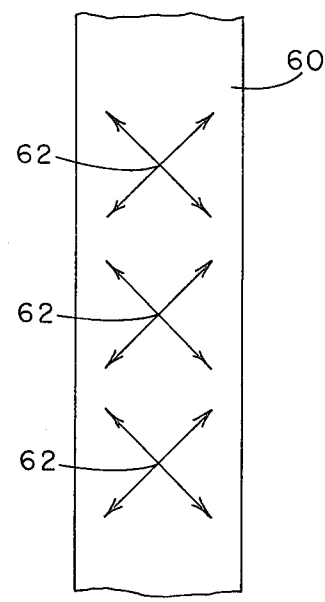
FIG. 3 shows a cross-laminated film.

FIG. 2 illustrates a bias oriented film 40. Arrows 42 show the direction of orientation of the film 40. One means for converting film 40 into a cross-laminated film is by slitting or folding film 40 along the imaginary center line represented by dotted line 44. Accordingly, the widthwise portions of the bias oriented film 40 are contacted in a manner such that the lower melting surfaces of these portions are contacted under temperature conditions such that the widthwise portions adhere to one another. FIG. 3 shows such a cross-laminated film 60 where the cross orientation of the films is represented by crossed arrows 62.

Other means for forming the cross-laminated film of FIG. 3 may be used. For example, two films may be formed, bias oriented and laminated to one another. Also, the composite film of FIG. 2 may be slit or cut along the widthwise direction of the film to form two films which may be laminated to one another.

The invention may comprise, consist essentially of or consist of the elements or method steps recited herein.

What is claimed is:

1. A method of forming a cross-laminated film comprising the steps of:
   (a) coextruding a composite film comprising a layer of lower melting thermoplastic and a layer of higher melting thermoplastic;
   (b) feeding said composite film through a pair of matched rollers having meshing grooves and ridges, said composite film being fed through said rollers at an angle of travel of less than ninety degrees with respect to the axes of rotation of said rollers to provide a bias oriented composite film by stretching said composite film between said rollers; and
   (c) forming a cross-laminated film by contacting lower melting thermoplastic layers of said oriented composite film under temperature conditions at which the lower melting thermoplastic layers adhere to one another.

2. The method of claim 1 wherein step (c) comprises slitting said oriented composite film and then contacting lower melting thermoplastic layers of the slit film.

3. The method of claim 1 wherein step (c) comprises folding said oriented composite film to contact lower melting thermoplastic layers.

4. The method of claim 1 wherein step (c) comprises contacting lower melting thermoplastic layers of two separate oriented composite films formed in accordance with step (b).

5. The method of claim 1 wherein said grooves and ridges of said rollers are parallel to the axes of rotation of said rollers.

6. The method of claim 1 wherein said grooves and ridges of said rollers are perpendicular to the axes of rotation of said rollers.

7. The method of claim 1, wherein said higher melting thermoplastic is selected from the group consisting of polyethylene, nylon, polyester and polypropylene.

8. The method of claim 1, wherein said higher melting thermoplastic is a high density polyethylene and said lower melting thermoplastic is selected from the group consisting of an ethylene/vinylacetate copolymer, a low density polyethylene polymer and an ethylene/propylene copolymer.

9. The method of claim 1, wherein said lower melting thermoplastic layer is about 10% of the overall thickness of said composite film and said higher melting thermoplastic layer is about 90% of the overall thickness of the composite film.

* * * * *